US012509258B2

(12) United States Patent
Lori

(10) Patent No.: US 12,509,258 B2
(45) Date of Patent: Dec. 30, 2025

(54) MACHINE FOR WRAPPING AN ITEM

(71) Applicant: TOSA S.P.A., S. Stefano Belbo (IT)

(72) Inventor: Giovanni Lori, Casale Monferrato (IT)

(73) Assignee: TOSA S.P.A., S. Stefano Belbo (IT)

( * ) Notice: Subject to any disclaimer, the term of this patent is extended or adjusted under 35 U.S.C. 154(b) by 0 days.

(21) Appl. No.: 18/713,560

(22) PCT Filed: Nov. 23, 2022

(86) PCT No.: PCT/IB2022/061317
§ 371 (c)(1),
(2) Date: May 24, 2024

(87) PCT Pub. No.: WO2023/095007
PCT Pub. Date: Jun. 1, 2023

(65) Prior Publication Data

US 2025/0026513 A1 Jan. 23, 2025

(30) Foreign Application Priority Data

Nov. 26, 2021 (IT) ........................ 102021000029924

(51) Int. Cl.
*B65B 11/04* (2006.01)
*B25J 9/00* (2006.01)
*B65B 41/16* (2006.01)

(52) U.S. Cl.
CPC ........... *B65B 11/045* (2013.01); *B25J 9/0096* (2013.01); *B65B 41/16* (2013.01); *B65B 2210/18* (2013.01)

(58) Field of Classification Search
CPC ................... B65B 11/045; B65B 41/16; B65B 2210/18; B25J 9/0096
USPC ............................................................ 53/203
See application file for complete search history.

(56) References Cited

U.S. PATENT DOCUMENTS 4,235,062 A * 11/1980 Lancaster, III ....... B65B 11/045 53/399
4,432,185 A * 2/1984 Geisinger ............. B65B 11/006 53/138.2
4,458,467 A * 7/1984 Shulman ............... B65B 11/045 53/399

(Continued)

FOREIGN PATENT DOCUMENTS

IT 201900015842 A 3/2021
IT 201900017258 A 3/2021

OTHER PUBLICATIONS

International Search Report and Written Opinion for PCT/IB2022/061317 (Mar. 3, 2023).

(Continued)

*Primary Examiner* — Dariush Seif
(74) *Attorney, Agent, or Firm* — Merchant & Gould P.C.

(57) ABSTRACT

Machinery for wrapping up an item, such as a pallet includes a rotatable support for supporting and rotating the item. A releasing device is for releasing a film around the item when the item is rotating on the rotatable support. A moving device is for moving the releasing device. A transfer system transports the film from a coil, located in a fixed position relative to a supporting surface, to the releasing device. The transfer system includes a first oblique diverter, mounted to the releasing device, for diverting the direction of the film as the film enters the releasing device.

15 Claims, 4 Drawing Sheets

(56) References Cited

U.S. PATENT DOCUMENTS

| | | | | |
|---|---|---|---|---|
| 4,807,427 | A * | 2/1989 | Casteel | B65B 11/006 53/389.2 |
| 4,862,678 | A * | 9/1989 | Humphrey | B65B 11/045 53/556 |
| 4,995,224 | A * | 2/1991 | Yourgalite | B65G 61/00 53/540 |
| 5,040,358 | A * | 8/1991 | Thimon | B65H 23/32 53/556 |
| 5,040,359 | A * | 8/1991 | Thimon | B65H 23/32 53/556 |
| 5,195,297 | A * | 3/1993 | Lancaster | B65B 11/045 53/399 |
| 5,195,301 | A * | 3/1993 | Martin-Cocher | B65B 11/045 53/465 |
| 5,216,871 | A * | 6/1993 | Hannen | B65D 71/0096 53/399 |
| 5,226,269 | A * | 7/1993 | Stoltenberg | B65B 39/04 53/436 |
| 5,351,461 | A * | 10/1994 | Fandard | B65B 11/585 53/157 |
| 5,463,842 | A * | 11/1995 | Lancaster | B65H 20/34 53/399 |
| 6,453,643 | B1 * | 9/2002 | Buscherini | B65B 11/025 53/399 |
| 6,594,970 | B1 * | 7/2003 | Hyne | B65B 11/025 53/399 |
| 7,178,317 | B1 * | 2/2007 | Koskela | B65B 11/045 53/587 |
| 7,568,327 | B2 * | 8/2009 | Lancaster, III | B65B 11/025 53/210 |
| 7,775,016 | B2 * | 8/2010 | Cousins | B65B 11/045 53/556 |
| 9,290,285 | B2 * | 3/2016 | Johnson | B65B 11/00 |
| 10,358,245 | B2 * | 7/2019 | Riemenschneider, III | B65B 59/003 |
| 10,392,143 | B2 * | 8/2019 | Butturini | B65B 45/00 |
| 10,538,350 | B2 * | 1/2020 | Lancaster, III | B65B 57/04 |
| 10,934,034 | B2 * | 3/2021 | Lancaster, III | B65B 11/025 |
| 11,345,494 | B2 * | 5/2022 | Jones | B65B 11/025 |
| 11,492,154 | B2 * | 11/2022 | Laghi | B65B 41/16 |
| 11,794,933 | B2 * | 10/2023 | Lancaster, III | B65B 11/04 |
| 2002/0020145 | A1 * | 2/2002 | Matsumoto | B65B 11/585 53/399 |
| 2002/0152726 | A1 * | 10/2002 | Oguri | B65B 7/164 53/442 |
| 2005/0011162 | A1 * | 1/2005 | Arima | B65B 11/045 53/399 |
| 2007/0204565 | A1 * | 9/2007 | Lancaster, III | B65B 11/025 53/399 |
| 2010/0025517 | A1 * | 2/2010 | Cere | B65B 11/025 242/559.1 |
| 2014/0208696 | A1 * | 7/2014 | Phillips | B65B 41/12 53/461 |
| 2017/0057677 | A1 * | 3/2017 | Terenzi | B65B 11/045 |
| 2020/0239168 | A1 * | 7/2020 | Sforacchi | B65B 61/22 |
| 2021/0039815 | A1 * | 2/2021 | Martin | B65B 11/025 |
| 2022/0169468 | A1 * | 6/2022 | Cousins | B65H 23/1825 |
| 2022/0227513 | A1 * | 7/2022 | Cere’ | B65B 41/16 |
| 2025/0012015 | A1 * | 1/2025 | Berglund | B65B 11/045 |
| 2025/0026513 | A1 * | 1/2025 | Lori | B65H 23/038 |

OTHER PUBLICATIONS

International Preliminary Report on Patentability for PCT/IB2022/061317 (Sep. 15, 2023).

* cited by examiner

MACHINE FOR WRAPPING AN ITEM

This application is a National Stage Application of International Application No. PCT/IB2022/061317, filed Nov. 23, 2022, which claims benefit of application No. 102021000029924, filed Nov. 26, 2021 in Italy, and which applications are incorporated herein by reference. To the extent appropriate, a claim of priority is made to each of the above-disclosed applications.

TECHNICAL FIELD

The present invention relates to a machinery for wrapping up an item, in particular a pallet.

TECHNICAL BACKGROUND

In the packaging industry, it is known to use wrapping machines for wrapping up items, including pallets. Some machines have a platform rotating about a vertical axis, whereon the pallet is placed, and a distributor device for spreading a film around the pallet as the platform rotates. When using a film made of polymeric material, the distributor device carries the film coil, which generally has a diameter of approximately 250 mm. Such coil can supply an amount of film which will suffice for a work shift of a few hours.

The need is however felt for using films made of alternative materials, particularly paper, in order to reduce the consumption of fossil fuels required by plastic films.

Nevertheless, one drawback is due to the fact that paper films are thicker than plastic films, and therefore a coil having the same diameter as those currently in use for plastic films (e.g. 250 mm) would allow the machine to remain in operation for just a few tens of minutes, resulting in frequent coil changes and long daily downtimes.

If, on the other hand, one wanted to use a paper coil capable of ensuring longer machine uptime, much bigger and heavier coils would be needed. In such a case, it would be necessary to design extremely bulky and costly machines.

SUMMARY OF THE INVENTION

It is one object of the present invention to provide a machinery capable of overcoming this and other drawbacks of the prior art while at the same time being simple and economical to manufacture.

According to the present invention, this and other objects are achieved through a machinery.

It is understood that the appended claims are an integral part of the technical teachings provided in the following detailed description of the present invention.

BRIEF DESCRIPTION OF THE DRAWINGS

Further features and advantages of the present invention will become apparent in light of the following detailed description, provided merely as a non-limiting example with reference to the annexed drawings, wherein.

DETAILED DESCRIPTION OF THE INVENTION

Figure 1:
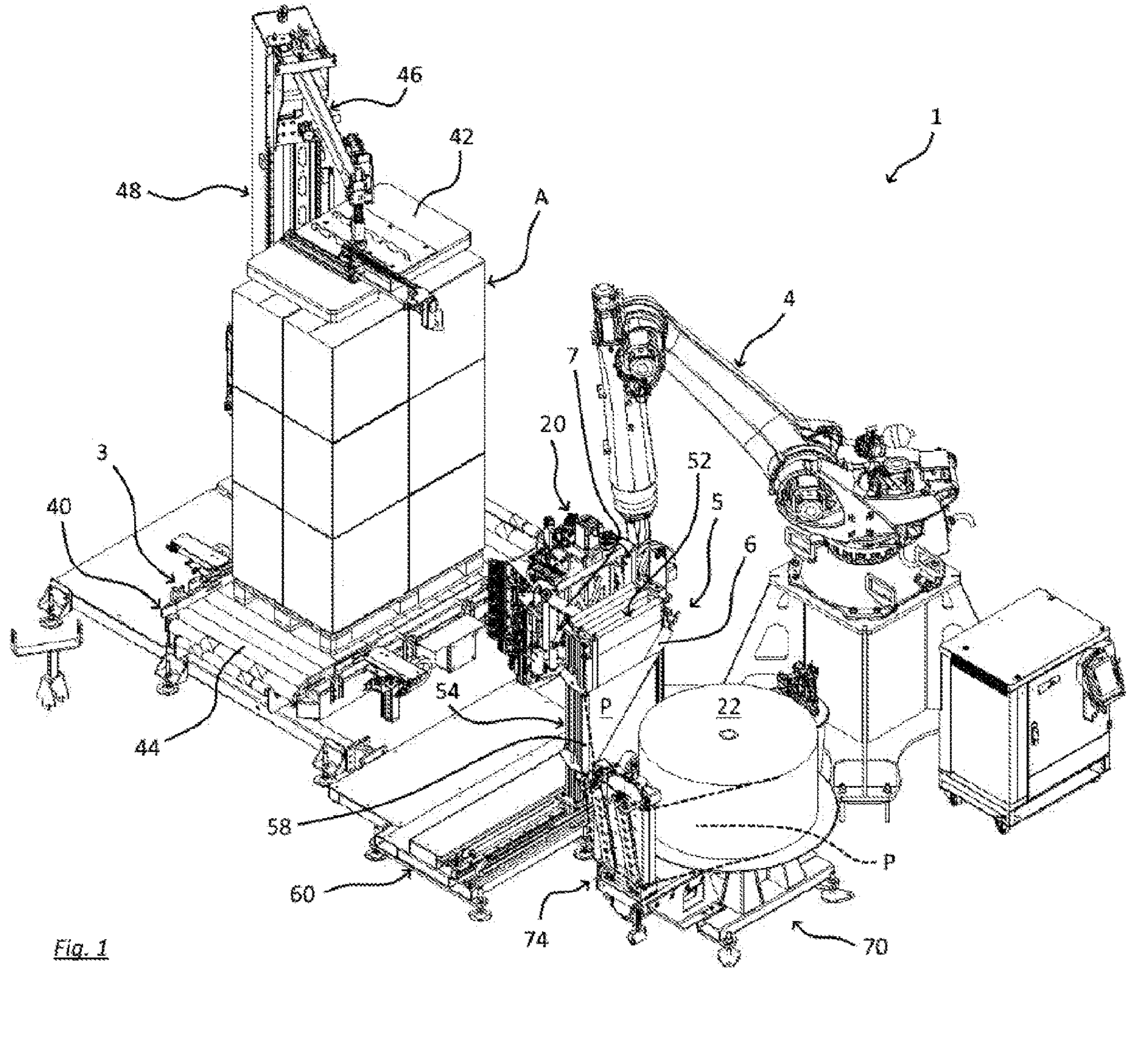
FIG. 1 is a perspective view of a machinery according to an exemplary embodiment of the present invention.

With reference to the annexed drawings, the following will describe a machinery 1 for wrapping up an item, in particular a pallet, comprising:

- a rotatable support 3 for supporting and rotating item A,
- a releasing device 20 for releasing a film P around item A when said item A is rotating on rotatable support 3,
- a moving device 4 for moving releasing device 20,
- a transfer system for transporting film P from a coil 22, located in a fixed position relative to a supporting surface, to releasing device 20.

The transfer system comprises a first oblique diverter 7, mounted to releasing device 20, for diverting the direction of film P as it enters preleasing device 20.

The invention advantageously permits wrapping up large items A or pallets while reducing the overall dimensions of machine 1. In fact, coil 22 (also known as "mother coil" in the prior art) is left standing on the supporting surface, optionally through the use of a supporting element, and does not move relative to the supporting surface while machinery 1 is in use. The transfer system advantageously permits moving releasing device 20 in space (in particular, three-dimensionally) while always leaving coil 22 in a fixed position relative to the supporting surface (which may be, for example, the ground or the floor). Since coil 22 for paper is very heavy and bulky, the transfer system eliminates the need for building a machinery 1 capable of continuously moving such coil 22 in space, which would make machinery 1 very bulky and expensive. Moreover, the use of big coils 22 permits long, uninterrupted work shifts also when packaging materials like paper are used, making machinery 1 highly efficient even with packaging materials like paper.

Preferably, film P is made of paper or paper-containing material, but machinery 1 may alternatively be used with a film P made of conventional polymeric material. The material of film P is the one wound on coil 22.

Preferably, the transfer system further includes: a compensation assembly 5 comprising a plurality of rollers 50, 52 rotatable about a prevalently horizontal axis, and between which film P is intended to pass, wherein at least one of such rollers 50 can vary its distance from the other rollers 52. Releasing device 20 is adapted to receive film P as it exits compensation assembly 5. According to one possible variant, compensation assembly 5 may be absent, e.g. when an effective compensation of film P is not required (as it is the case when the unwinding of coil 22 is controlled in a very precise manner as a function of the amount of film P used at a given instant). According to some possible variants, rollers 50, 52 are rotatable about an axis which is not prevalently horizontal, e.g. an oblique or vertical axis.

Optionally, compensation assembly 5 comprises a second oblique diverter 6 for diverting the direction of film P coming from coil 22. The second oblique diverter 6 is placed at the entrance of compensation assembly 5, with reference to the flow of film P. In the example, the second oblique diverter 6 lies on an axis which is inclined by 45° relative to a horizontal plane. According to some alternative variants, the second oblique diverter 6 may have different angles, e.g. it may lie on an axis inclined by 30° to 60°, or 40° to 50°, relative to a horizontal plane.

According to some possible alternative embodiments, the first and/or second oblique diverters 7, 6 are rollers, preferably fixed rollers (i.e. rollers that cannot rotate about their longitudinal axis). As an alternative, the first and/or second oblique diverters 7, 6 may consist of metal sheets, particularly calendered metal sheets. In the example shown herein, the first and second oblique diverters 7, 6 are fixed rollers.

In the present non-limiting embodiment, the illustrated rollers are elongate in shape, i.e. their length exceeds their diameter.

In particular, illustrated coil 22 is arranged to turn about a substantially vertical axis. The second oblique diverter 6 is especially useful when coil 22 has a vertical axis of rotation, as in the present example. In such a coil 22, in fact, the layers of film P are disposed vertically, but the rollers of compensation assembly 5 are horizontal, and the second oblique diverter 6 makes it possible to cause film P to come with the appropriate orientation for passing between the horizontal rollers of compensation assembly 5.

In an alternative variant, coil 22 is arranged to turn about a substantially horizontal axis. In such a case, the second oblique diverter 6 may be omitted because film P can already pass between the horizontal rollers of compensation assembly 5 without undergoing any bending in the plane of film P itself, which might cause it to break.

According to some possible variants, coil 22 is arranged to rotate about an oblique axis, and the second oblique diverter 6 may be present and have a suitable inclination.

In the present description, spatial orientations are described with reference to a machinery 1 placed on a horizontal surface. The rollers of compensation assembly 5 are prevalently horizontal, in particular horizontal, even though it is alternatively conceivable to adopt a small angle, e.g. 5°, relative to the horizontal. The term idle roller refers to a roller that is free to rotate.

Figure 3:
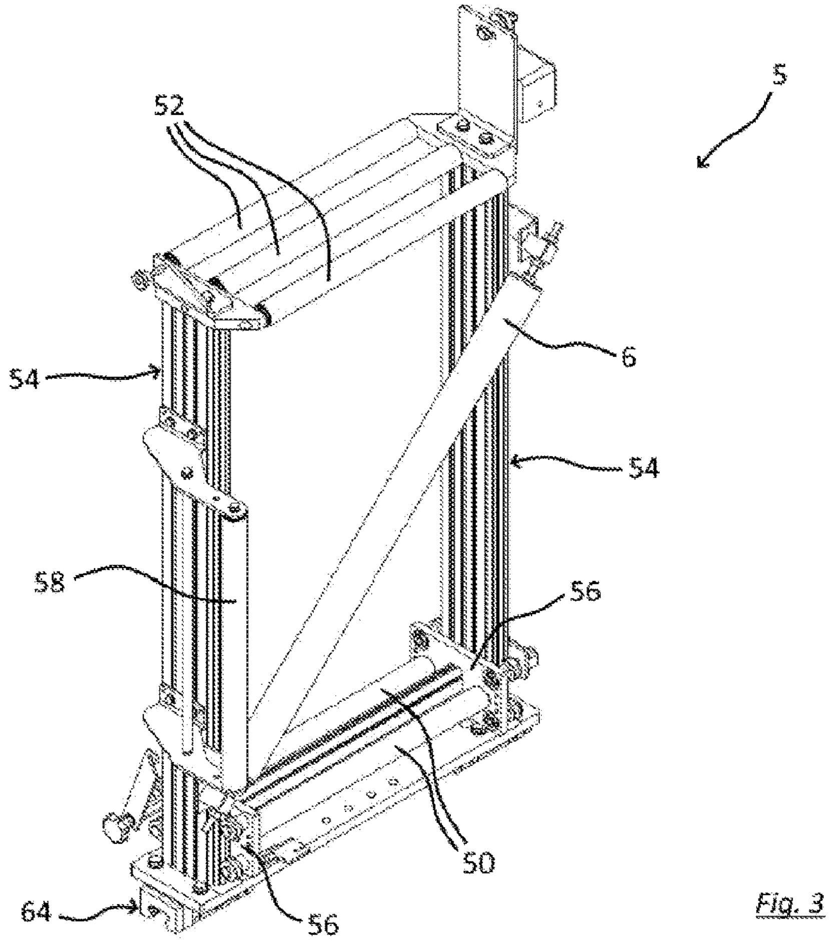
FIG. 3 shows a detail of a compensation assembly.
Figure 4:
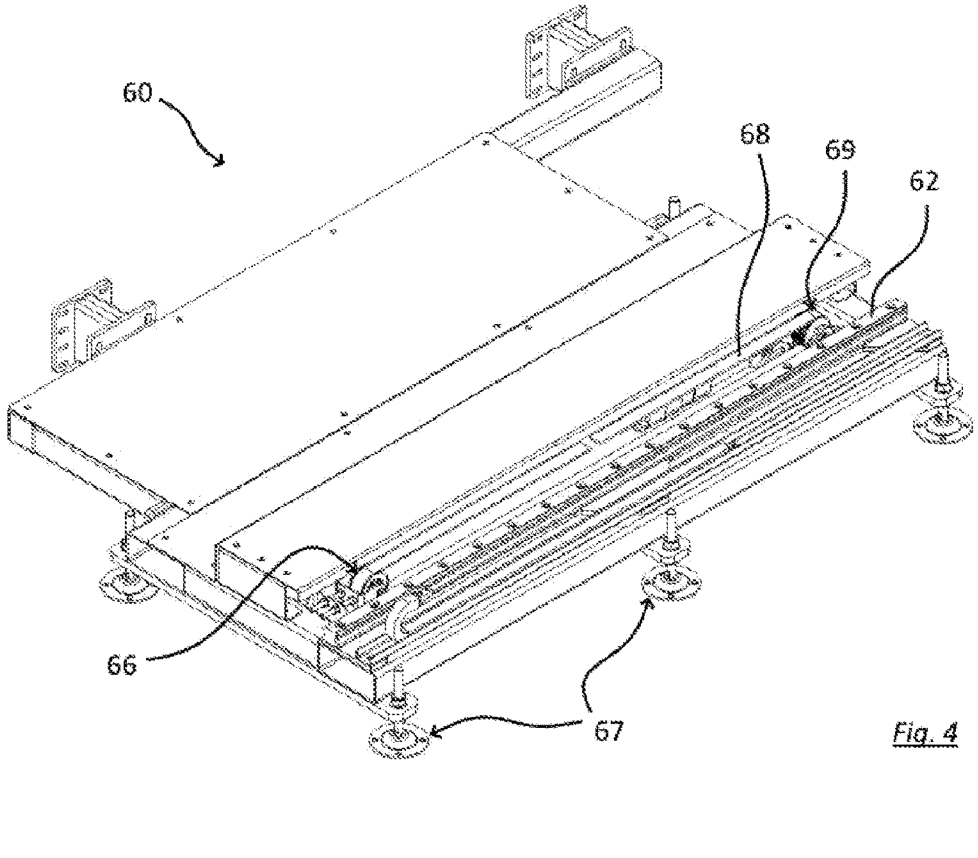
FIG. 4 shows a detail of a horizontal guide.
Figure 5:
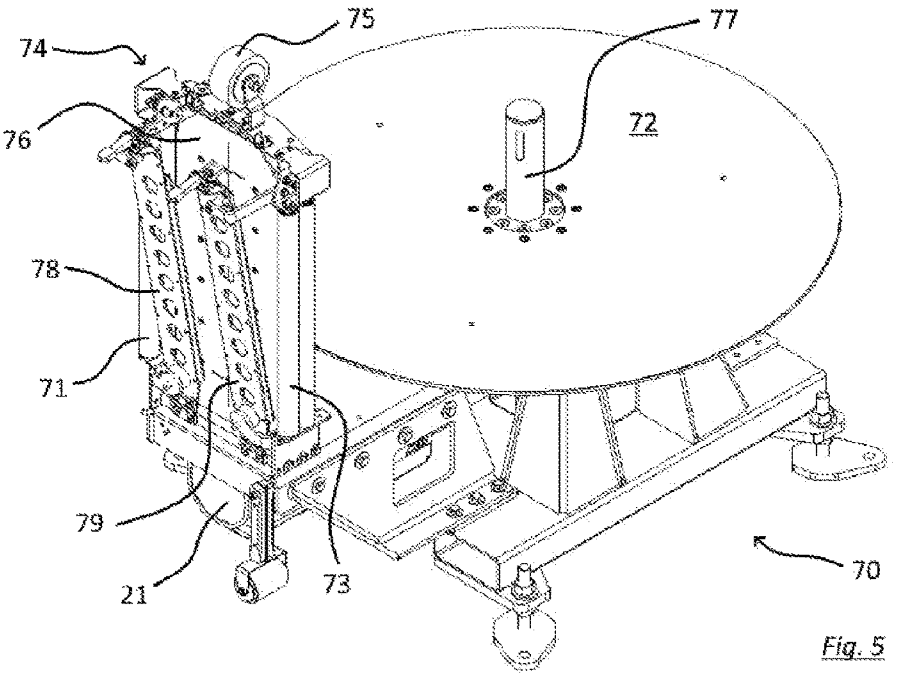
FIG. 5 shows a detail of a coil supporting and unwinding device.

With reference to FIG. 3, compensation assembly 5 includes two movable rollers 50. In this example, it 5 includes five rollers, two of which are movable 50 and three of which are fixed 52. Rollers 50, 52 are rotatable about a respective axis of rotation. Movable rollers 50 are adapted to move, in particular to slide, relative to fixed rollers 52. Movable rollers 50 are adapted to move away and towards fixed rollers 52. In this example, rollers 50, 52 are idle. In this non-limiting example, movable rollers 50 lie lower than fixed rollers 52. Generally, compensation assembly 5 includes at least one movable roller 50 and one fixed roller 52. In the present example, compensation assembly 5 is not vertically movable.

In particular, rollers 50, 52 are rotatable about their axis of rotation. Movable rollers 50 can also move relative to compensation assembly 5 in order to move away or towards the fixed ones 52. Fixed rollers 52 can only rotate about their axis of rotation.

The at least one movable roller 50 of compensation assembly 5 is movable vertically, or perpendicularly to its own axis of rotation. Preferably, said movable rollers 50 are adapted to move along a straight trajectory. In particular, compensation assembly 5 comprises a guidance system for guiding the movement of movable rollers 50. In the example, compensation assembly 5 includes two guides 54, and the two ends of rollers 50 are slidably mounted to such guides 54. In more detail, the two guides 54 are arranged vertically. In more detail, movable rollers 50 are mounted at their ends to two brackets 56, each bracket 56 being slidably mounted to the respective guide 54.

Optionally, compensation assembly 5 has an idle auxiliary roller 58 around which film P is intended to pass as it enters compensation assembly 5. Auxiliary roller 58 is substantially vertical. With reference to the flow of film P, auxiliary roller 58 is located upstream of oblique diverter 6 and the other rollers 50, 52 of compensation assembly 5. Film P touches auxiliary roller 58 first, then oblique diverter 6, and lastly all the other rollers 50, 52.

Film P entering compensation assembly 5 touches a first fixed roller 52, then a first movable roller 50, then a second fixed roller 52, then a second movable roller 50, and finally a third fixed roller 52. At this point, film P heads for releasing device 20.

Compensation assembly 5 advantageously permits accumulating useful film P to be released as necessary during the wrapping operation, or, vice versa, recovering film P, so as to follow the movement of releasing device 20. For example, when releasing device 20 moves away from compensation assembly 5, there is an urgent need for unwinding a large quantity of film P; conversely, when releasing device 20 moves closer to compensation assembly 5, there is an urgent need for winding some film P. Without compensation assembly 5, coil 22 would have to instantaneously supply the required amount of film P as imposed by the movement of releasing device 20, but this would in practice be difficult to achieve because it would require complex controls, and it would be made even harder by the fact that a coil 22 having a diameter of 1,000-1,200 mm and a weight of approximately 300-400 kg would be involved. With compensation assembly 5, instead, the rotational speed of coil 22 can remain constant or vary smoothly, without the risk of tearing film P or having loose and floppy sections of film P.

Machinery 1 conveniently comprises motor means 21, e.g. an electric motor, for rotating coil 22. In fact, since coil 22 is heavy, the motor means help unwinding film P.

Preferably, machinery 1 comprises a control unit configured to actuate motor means 21 for rotating coil 22 as a function of at least the position of the at least one movable roller 50 belonging to compensation assembly 5. Depending on the position of the at least one movable roller 50 relative to the at least one fixed roller 52, the control unit controls said motor means 21. There is a sensor for detecting the position of the at least one movable roller 50, and the control unit is adapted to receive a signal from such sensor to control the actuation of motor means 21 that drive coil 22. Thus, the speed of coil 22 will keep up with the instantaneous request for film P that causes the fixed and movable rollers to move towards/away from each other 52, 50, so as to reduce the risk of breaking film P and avoid having too much loose film P.

Conveniently, but optionally, compensation assembly 5 is configured to slide horizontally. In particular, compensation assembly 5 is slidably mounted on a horizontal guide 60. Such horizontal guide 60 is adapted to be installed on the supporting surface, e.g. on the floor. This feature allows compensation assembly 5 to follow the movement of releasing device 20, which, in the preferred embodiment illustrated herein, can move three-dimensionally. In fact, when releasing device 20 moves horizontally, compensation assembly 5 will follow it to avoid tearing film P located between compensation assembly 5 and releasing device 20. In particular, horizontal guide 60 allows compensation assembly 5 to slide along a straight trajectory. Machinery 1 comprises moving means for moving compensation assembly 5 horizontally, in particular along a straight trajectory. A control system is configured to control the horizontal motion of compensation assembly 5 as a function of the position of releasing device 20, particularly by actuating the moving means.

In particular, horizontal guide 60 comprises a rail 62 whereon an engagement portion 64 of compensation assembly 5 is slidably engaged. In the example, horizontal guide 60 comprises moving means for moving compensation assembly 5. For example, the moving means include an actuator, in particular a linear actuator, or a motor, in particular an electric motor. In particular, horizontal guide 60 comprises a drive pulley 66 connected to a belt 68 or a chain constrained to compensation assembly 5 for moving it. There is also a driven pulley 69, on which belt 68 is mounted. In the particular example shown herein, feet 67 are provided, preferably adjustable ones, for laying horizontal guide 60 on the floor.

Optionally, compensation assembly 5 is rotatable about an axis, in particular a vertical axis. Such rotation is possible in any case, whether or not it 5 can be moved horizontally. Such rotation may be either free or controlled by an actuator. Conveniently, the control unit coordinates such rotation, by means of the associated actuator, with the position or motion of releasing device 20. Such rotation permits directing film P exiting assembly 5 towards releasing device 20, without bending film P in its plane.

In the example, releasing device 20 comprises a plurality of rollers 23, 24, 25, 26 rotatable about a prevalently vertical axis, between which film P is intended to pass, wherein at least one of such rollers 23, 24, 25, 26 can vary its distance from the other rollers 23, 24, 25, 26. Releasing device 20 is adapted to release the film, under proper tension, around the pallet. Such device 20 has a plurality of rollers 23, 24, 25, 26 for stretching the film. In particular, releasing device 20 does not include a support for a coil of film P. According to some possible variants, releasing device 20 may be per se known.

Figure 6:
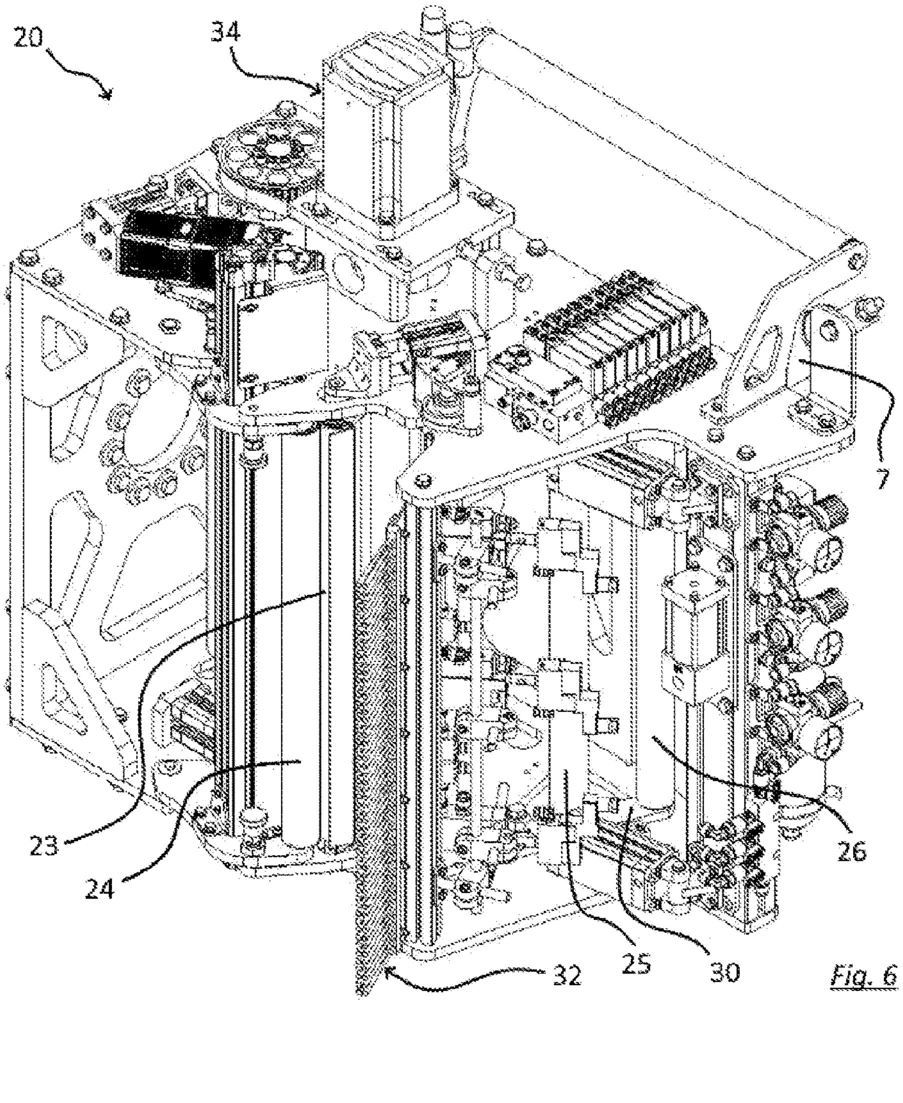
FIG. 6 shows a detail of a film releasing device.

Releasing device 20 comprises a plurality of rollers 23, 24, 25, 26, between which film P is intended to pass, for adjusting the tension thereof. Preferably, releasing device 20 comprises a drive roller for pulling film P. The film exiting releasing device 20 is ready to be wrapped around item A. Rollers 23, 24, 25, 26 may be idle, or, alternatively, some of them (at least one) may be motorized. In the example, rollers 23, 24, 25, 26 are oriented vertically. In FIG. 6, a motor 34 actuates a drive roller (not shown).

Preferably, releasing device 20 comprises a movable arm 30 whereon two rollers 25, 26 are mounted, which, in particular, are freely rotatable. The film is intended to pass around such rollers 25, 26. Other rollers (e.g. no. 24) are, on the contrary, fixedly mounted relative to releasing device 20. In particular, movable arm 30 is rotatable about an axis of rotation, which in the example is prevalently vertical. This advantageously permits accumulating useful film to be released as necessary during the wrapping process or, vice versa, recovering film, e.g. when wrapping pallet edges. Arm 30 thus permits greater film accumulation in a smaller area. In fact, the two rollers 25, 25 lengthen the path followed by the film, and the mobility of movable arm 30 provides a greater increase in film length before the film is wrapped around the pallet. For example, if only one roller were mounted on the movable arm (as in the prior art), a very long and bulky movable arm would be necessary in order to accumulate the film. Conveniently, an elastic means, e.g. a spring, tends to bring the movable arm into a predefined position. Preferably, there is an actuator or motor for moving movable arm 30. In the example, roller 23 is movable and adapted to be moved away from or closer to roller 24, which is fixed. An actuator is adapted to move roller 23.

However, according to some possible variants, releasing device 20 comprises at least one movable roller and at least one fixed roller. Therefore, at least one roller 25, 26 is movably mounted to the releasing device 20, and at least one roller 24 is fixedly mounted to said releasing device 20. A "movable roller" is meant to be a roller which can both rotate about its axis of rotation and move relative to releasing device 20. Conversely, the fixed roller can only rotate about its axis of rotation. Preferably, there is an actuator or motor for moving the at least one movable roller.

Releasing device 20 comprises the first oblique diverter 7, which, in particular, is fixed. In the example, the first oblique diverter 7 lies on an axis which is inclined by 45° relative to the axis of rollers 23, 24, 25, 26 of releasing device 20. According to some alternative variants, the first oblique diverter 7 may have different angles, e.g. it may lie on an axis inclined by 30° to 60°, or 40° to 50°, relative to the axis of rollers 23, 24, 25, 26 of releasing device 20. In particular, the first oblique diverter 7 lies on an axis which is inclined by 45° relative to a horizontal plane. According to some alternative variants, the first oblique diverter 7 may have different angles, e.g. it may lie on an axis inclined by 30° to 60°, or 40° to 50°, relative to a horizontal axis.

Rollers 50, 52 of compensation assembly 5 are horizontal, but rollers 23, 24, 25, 26 of releasing device 20 are substantially vertical. The first oblique diverter 7 makes it possible to have film P arrive with the proper orientation for passing between the substantially vertical rollers 23, 24, 25, 26 of releasing device 20. The first oblique diverter 7 allows diverting film P.

Preferably, releasing device 20 has a cutting device for cutting film P, and such device may be per se known. For example, the cutting device comprises a blade or wire. Preferably, the blade or wire is made of metal material, and means are provided for heating the blade or wire. For example, the blade or wire is connected to a power supply unit. When supplied with electric current, the blade or wire will get hot, thus cutting film P.

Preferably, releasing device 20 includes a dispenser for dispensing glue onto film P. The dispenser, which may be per se known, may include, for example, a sprayer, or a brush 32 to be impregnated with glue.

Preferably, moving device 4 is an anthropomorphic robot, in particular of the six-axis type. Such robot may be per se known. Moving device 4 is adapted to be fastened to the supporting surface, e.g. the floor. Preferably, moving device 4 is adapted to move releasing device 20 in three dimensions. Therefore, in addition to moving it 20 vertically, it can also move it in a horizontal plane. In particular, moving device 4 is adapted to move releasing device 20 along three straight directions in space, wherein such directions are mutually perpendicular (e.g. the three Cartesian directions, also known as x, y, z). Conveniently, moving device 4 is also adapted to rotate releasing device 20. According to several possible variations thereof, moving device 4 is adapted to rotate releasing device 20 about one, two or three axes of rotation, which are preferably orthogonal to each other. In general, moving device 4 is adapted to move releasing device 20 at least vertically, i.e. to vary its height.

As item A rotates, moving device 4 moves releasing device 20 vertically so as to wrap film P around item A. Generally, film P is wrapped helically around item A. Releasing device 20 can be caused to make a rotation in order to better follow the direction of film P around the item, so as to prevent any creases or tears, particularly when processing a film P made of paper. In fact, as releasing device 20 rises vertically and film P is helically wound, it is desirable to orient rollers 23, 24, 25, 26 of releasing device 20 in such a way as to cause film P to exit such device 20 with the same angle that such film P will assume on item A, without a side of film P being too stretched and the other side being creased. This effect is particularly beneficial for rigid materials like paper, while for deformable materials like plastic the elasticity of film P can already ensure good adherence to item A without the film undergoing any damage.

In particular, moving device 4 rotates releasing device 20 about a horizontal axis, at least at certain times while wrapping film P around item A. Sometimes moving device 4 keeps releasing device 20 stationary with rollers 23, 24, 25, 26 in the vertical position, and other times it rotates releasing device 20 about a horizontal axis. These movements are coordinated by a control system, particularly as a function of the rotation of rotatable support 3 and of the height above ground of releasing device 20. For example, moving device 4 rotates releasing device 20 in such a way that its rollers 23, 24, 25, 26 have a maximum inclination of 5°, 10°, 20° or 30° relative to the vertical.

Rotatable support 3, which may be per se known, has a lower support 40 (a platform in this example), whereon item A is placed, and which can rotate, in particular about a vertical axis. Conveniently, there is also an upper support 42 (a platform in this example) for pressing item A from above, and which can rotate, in particular about a vertical axis. In particular, lower support 40 comprises rollers 44 to allow item A to slide along a line for packaging or preparing item A. Item A arrives at rotatable support 3 in the correct position by sliding on rollers 44. During its rotation, rotatable support 3 is configured to hold item A in the correct position, preventing it from falling. In particular, motor means are provided for rotatably actuating lower support 40 and/or upper support 42. Item A is then rotated, in particular about a vertical axis, by rotatable support 3, more specifically by supports 40, 42.

Preferably, actuator means (e.g. a motor and transmission means) are provided for varying the distance between supports 40, 42, so as to adapt it to differently sized items. In particular, the actuator means are configured for moving upper support 42 relative to lower support 40, and particularly for moving said upper support 42 at least vertically. The actuator means are adapted to hold and retain item A between supports 40, 42 during the rotation of item A.

In particular, rotatable support 3 has an arm 46 that supports upper support 42. Rotatable support 3 has a column 48 whereon arm 46 is mounted. Preferably, arm 46 is configured to slide vertically and stop in a plurality of vertical positions along column 48. It is thus possible to adjust the distance between supports 40, 42 according to the height of item A. Conveniently, motor means are provided for controlling the vertical motion of arm 46.

Conveniently, machinery 1 comprises a supporting device 70 for supporting coil 22. Supporting device 70 comprises a rotary table 72 for rotatably supporting coil 22. Preferably, motor means are provided, e.g. an electric motor, for rotating rotary table 72, and hence coil 22. In the example, rotary table 72 turns about a vertical axis. Therefore, coil 22 can rotate to unwind film P, but during the normal use of machinery 1 it is not intended to translate relative to machinery 1 and the supporting surface (e.g. the floor). In the example, supporting device 70 comprises a pin 77 adapted to fit into a central hole that is generally present in a coil 22.

Preferably, supporting device 70 comprises a coil replacement system 74 for joining a terminal part of film P to an initial part of film P of a new coil 22. In particular, coil replacement system 74 comprises an abutment plate 76 and two movable bars 78, 79 adapted to abut against abutment plate 76 for holding a section of film P. Between each movable bar 78, 79 and abutment plate 76, a section of film P is intended to be pressed and held in position. In particular, movable bars 78, 79 are rotatable relative to abutment plate 76, in particular about a horizontal axis of rotation. In the example, movable bars 78, 79 are mounted to abutment plate 76. Conveniently, locking means are provided for keeping movable bars 78, 79 in abutment with abutment plate 76, for the purpose of holding the portions of film P in position.

In the example, coil replacement system 74 comprises a support for adhesive tape 75. In particular, said support is mounted to abutment plate 76, conveniently to the top thereof.

When a coil 22 is about to finish, machinery 1 is stopped, and one end of film P is clamped between movable bar 78 and abutment plate 76. Film P is then cut between the two movable bars 78, 79, and old coil 22 is removed from rotary table 72. A new coil 22 is then loaded on rotary table 72, and then the initial part of new film P is brought near movable bar 79, and that end of new film P is clamped between movable bar 79 and abutment plate 76. In this condition, the user then joins the two ends of films P, e.g. by means of glue or adhesive tape. Finally, the user opens movable bars 78, 79 to release film P. Machinery 1 is now ready for normal operation again.

Figure 2:
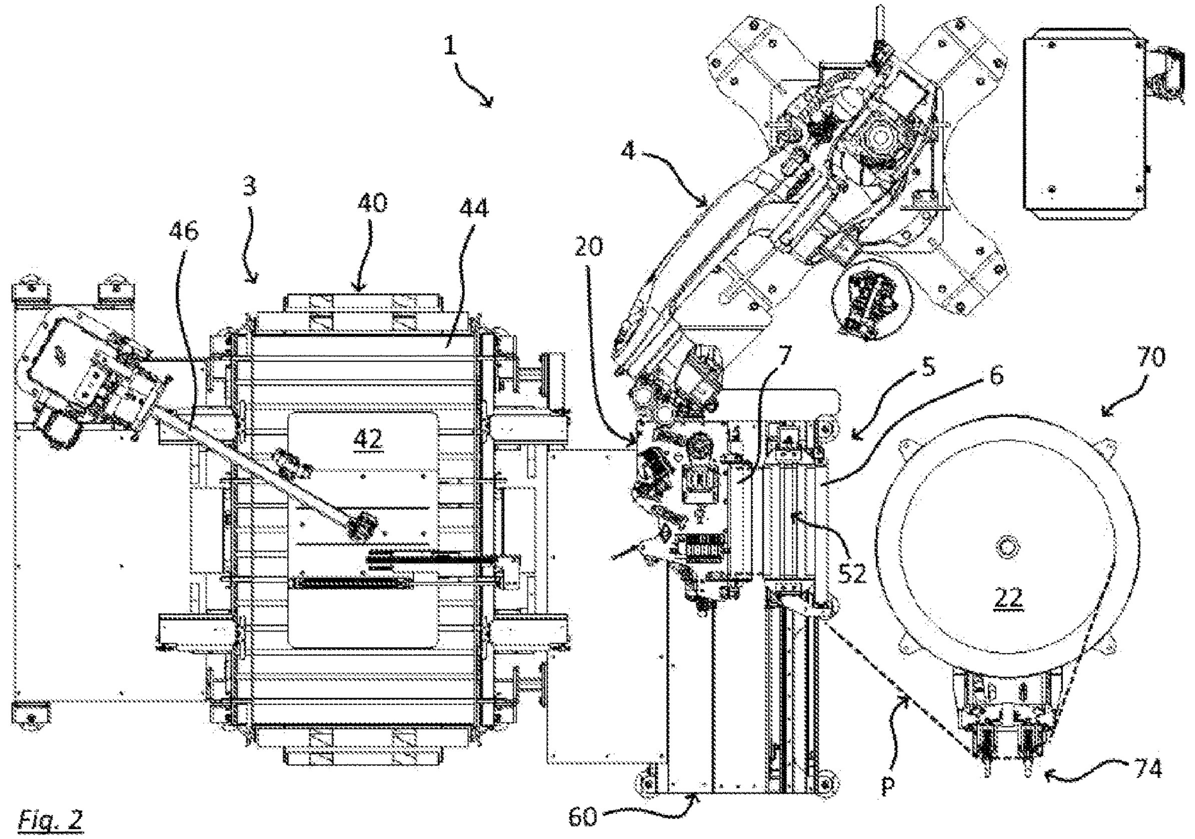
FIG. 2 is a plan view of the machinery of FIG. 1.

Preferably, supporting device 70 comprises two idle rollers 71, 73 whereon film P is intended to slide. In the example, rollers 71, 73 are mounted to abutment plate 76, in particular to the sides of said abutment plate 76. Rollers 71, 73 are configured to cause film P to slide between movable bars 78, 79 and abutment plate 76 when movable bars 78, 79 are not in abutment with abutment plate 76. During normal use, film P slides on rollers 71, 73 without touching either movable bars 78, 79 or abutment plate 76. After touching roller 71, film P proceeds towards compensation assembly 5, particularly towards auxiliary roller 58. In FIG. 1, the dashed line schematically indicates, in transparency, film P. In FIG. 2, the dashed line schematically indicates the path followed by film P.

Preferably, the machinery comprises a control system, e.g. a control unit (in particular, a PLC), configured for coordinating the movements of one or more movable parts of machinery 1. For example, said control system is adapted to control and coordinate the motion of one or more of: releasing device 20, the actuators, the motor means (including no. 21), rotatable support 3, moving device 4, compensation assembly 5, the emission of an alarm signal in the event of a fault (e.g. through audible and/or luminous signalling means).

According to one possible embodiment, the control system is configured for receiving from the user information about the item or pallet to be wrapped up, and, based on such information, for wrapping up the item with the film by coordinating the movements of machinery 1 and of the various parts thereof. Such information may include the dimensions, shape, contents, etc. of the item. In addition, a user interface is conveniently provided, through which the user can interact with the control system. The interface may include elements that are per se known, including a screen (e.g. a touchscreen), a keyboard, push-buttons, etc.

The control system may include, for example, several interconnected control units, conveniently connected to one another in wireless mode.

In the example, the control system of machinery 1 is configured for moving compensation assembly 5 along horizontal guide 60 to have it follow the horizontal movements of releasing device 20.

In the example, the control system of machinery 1 is configured for coordinating the movements of releasing device 20, those of rotatable support 3, and those of moving device 4.

In the example, the control system of machinery 1 is configured for coordinating the movements of the parts of releasing device 20, in particular for controlling the cutting device, the dispenser and/or the drive roller.

Machinery 1 further comprises sensors for detecting the mutual or relative positions of the various components, their speed or acceleration, or other parameters needed by the control system. The sensors may be per se known, e.g. encoders, photo cells, switches, load sensors, accelerometers, etc.

Preferably, but optionally, compensation assembly 5 and releasing device 20 are not configured for pre-stretching film P. The (motorized or idle) rollers of compensation assembly 5 and of releasing device 20 are configured for not increasing the internal strains of film P, so as to not cause said film P to undergo any permanent deformation.

The present invention also concerns a transfer system adapted to be installed in a machinery 1 for wrapping up an item A, comprising:

- a rotatable support 3 for supporting and rotating item A,
- a releasing device 20 for releasing a film P around item A when said item A is rotating on rotatable support 3,
- a moving device 4 for moving releasing device 20.

The transfer system is adapted to transport film P from a coil 22, located in a fixed position relative to a supporting surface, to releasing device 20, and comprises:

- a compensation assembly 5 comprising a plurality of rollers 50, 52 rotatable about a prevalently horizontal axis, and between which film P is intended to pass, wherein at least one of such rollers 50 can vary its distance from the other rollers 52;
- a first oblique diverter 7, mounted to releasing device 20, for diverting the direction of film P coming from compensation assembly 5.

The details of the transfer system have already been described above, and for brevity's sake they will not be repeated. The transfer system may be a kit which can be installed on an existing machinery 1. Preferably, the kit includes:

- the transfer system,
- the moving means for moving compensation assembly horizontally,
- the control system configured for controlling the horizontal motion of compensation assembly 5 as a function of the position of releasing device 20.

The present invention also concerns a method for wrapping a paper film P around an item A, in particular a pallet, comprising the use of machinery 1 according to one or more embodiments thereof.

Of course, without prejudice to the principle of the invention, the forms of embodiment and the implementation details may be extensively varied from those described and illustrated herein by way of non-limiting example, without however departing from the scope of the invention as set out in the appended claims.

The invention claimed is:

1. A machinery for wrapping an item, the machinery comprising:

- a rotatable support for supporting and rotating the item;
- a releasing device for releasing a paper film around the item when said item is rotating on the rotatable support;
- a moving device for moving the releasing device;
- a transfer system for transporting the film from a coil, located in a fixed position relative to a supporting surface, to the releasing device; wherein the transfer system comprises:
  - a first oblique diverter, mounted to the releasing device, for diverting a direction of the film as the film enters the releasing device;
  - a compensation assembly, configured for sliding horizontally, comprising a plurality of rollers rotatable about a prevalently horizontal axis, and configured for the film to pass between the rollers, wherein at least one of the rollers is configured to vary a distance from the other rollers; wherein the releasing device is adapted to receive the film as the film exits the compensation assembly;
  - moving means for moving the compensation assembly horizontally.

2. The machinery according to claim 1, wherein the compensation assembly comprises a second oblique diverter for diverting the direction of the film coming from the coil.

3. The machinery according to claim 1, wherein the releasing device comprises a plurality of rollers rotatable about a prevalently vertical axis and configured for the film to pass between the rollers, wherein at least one of the rollers is configured to vary a distance from the other rollers.

4. The machinery according to claim 1, comprising a motor for rotating the coil.

5. The machinery according to claim 4, comprising a control unit configured to actuate the motor for rotating the coil as a function of at least a position of at least one movable roller belonging to the compensation assembly.

6. The machinery according to claim 1, wherein the moving device is an anthropomorphic robot.

7. The machinery according to claim 1, comprising a supporting device for supporting the coil, including a coil replacement system comprising an abutment plate and two movable bars adapted to abut against the abutment plate for holding a section of the film.

8. The machinery according to claim 1, wherein the compensation assembly is vertically immovable.

9. The machinery according to claim 1, wherein the compensation assembly is incapable of pre-stretching the film.

10. The machinery according to claim 1, comprising a control system configured for controlling horizontal motion of the compensation assembly as a function of a position of the releasing device.

11. A method for wrapping a paper film around an item, comprising using a machinery according to claim 1 and wrapping the item with the paper film.

12. The machinery according to claim 1, wherein the item comprises a pallet.

13. A transfer system adapted to be installed in a machinery for wrapping an item, the machinery comprising:

- a rotatable support for supporting and rotating the item;
- a releasing device for releasing a paper film around the item when said item is rotating on the rotatable support;
- a moving device for moving the releasing device;
- wherein the transfer system is adapted to transport the film from a coil, located in a fixed position relative to a supporting surface, to the releasing device, and comprises:
- a compensation assembly, configured for sliding horizontally, comprising a plurality of rollers rotatable about a prevalently horizontal axis, and configured for the film to pass between the rollers, wherein at least one of the rollers is configured to vary a distance from the other rollers;

a first oblique diverter, mounted to the releasing device, for diverting a direction of the film coming from the compensation assembly.

14. The transfer system according to claim 13, wherein the item comprises a pallet.

15. A kit comprising:

a transfer system according to claim 13;

moving means for moving the compensation assembly horizontally;

a control system configured for controlling horizontal motion of the compensation assembly as a function of a position of the releasing device.

* * * * *